(12) United States Patent
Yang et al.

(10) Patent No.: US 12,553,517 B2
(45) Date of Patent: Feb. 17, 2026

(54) O-RING MOUNTING TEMPLATE AND METHOD

(71) Applicant: Applied Materials, Inc., Santa Clara, CA (US)

(72) Inventors: Yao-Hung Yang, Santa Clara, CA (US); Fred Eric Ruhland, Pleasanton, CA (US); Chih-Yang Chang, Cupertino, CA (US); Chiache Lin, Hsinchu (TW); Saurabh Murlidhar Chaudhari, San Jose, CA (US); Sridhar Kenchanapura Nagaraju, Bangalore (IN); Kishan Rao, Bangalore (IN)

(73) Assignee: Applied Materials, Inc., Santa Clara, CA (US)

( * ) Notice: Subject to any disclaimer, the term of this patent is extended or adjusted under 35 U.S.C. 154(b) by 613 days.

(21) Appl. No.: 17/851,150

(22) Filed: Jun. 28, 2022

(65) Prior Publication Data

US 2023/0272855 A1 Aug. 31, 2023

(30) Foreign Application Priority Data

Feb. 25, 2022 (IN) .............................. 202241010179

(51) Int. Cl.
*F16J 15/06* (2006.01)
*B25B 27/00* (2006.01)
*F16J 15/02* (2006.01)

(52) U.S. Cl.
CPC ......... *F16J 15/061* (2013.01); *B25B 27/0028* (2013.01); *F16J 15/022* (2013.01)

(58) Field of Classification Search
CPC ........ F16J 15/022; F16J 15/061; F16J 15/104; F16J 15/108; B25B 27/0028
See application file for complete search history.

(56) References Cited

U.S. PATENT DOCUMENTS 5,564,714 A * 10/1996 Katsuno .................. B29C 37/02
277/924
5,577,314 A * 11/1996 Katsuno .................. B25B 27/28
29/451

(Continued)

FOREIGN PATENT DOCUMENTS

CN 102468205 A 5/2012
JP H 07266221 A 10/1995

(Continued)

OTHER PUBLICATIONS

International Search Report and Written Opinion dated Nov. 23, 2022 for Application No. PCT/US2022/034771.

(Continued)

*Primary Examiner* — Nicholas L Foster
(74) *Attorney, Agent, or Firm* — Patterson + Sheridan, LLP

(57) ABSTRACT

An apparatus for inserting a seal member into a seal groove includes a tray. The tray includes a holding groove formed in a front surface for containing the seal member. The holding groove is sized and shaped to correspond with the seal groove. A method of installing a seal member into a seal groove includes aligning the holding groove with the seal groove, and applying a pressure to a back surface of the tray, thereby deforming the tray and inserting the seal member into the seal groove.

20 Claims, 11 Drawing Sheets

(56) References Cited

U.S. PATENT DOCUMENTS

| | | | | |
|---|---|---|---|---|
| 5,733,493 | A * | 3/1998 | Katsuno | B26F 1/3846 |
| | | | | 264/255 |
| 5,794,947 | A * | 8/1998 | Shimizu | F16J 15/061 |
| | | | | 277/630 |
| 6,012,209 | A * | 1/2000 | Whetstone | B23P 19/084 |
| | | | | 29/235 |
| 6,408,497 | B1 | 6/2002 | Whetstone | |
| 7,047,619 | B2 | 5/2006 | Wambold et al. | |
| 7,096,551 | B2 | 8/2006 | Lackowski, II | |
| 7,316,401 | B2 * | 1/2008 | Casler | F16J 15/126 |
| | | | | 277/630 |
| 7,370,865 | B2 | 5/2008 | Vik et al. | |
| 9,969,069 | B2 | 5/2018 | Pergantis et al. | |
| 10,513,066 | B2 * | 12/2019 | Kurano | F16J 15/108 |
| 10,514,099 | B2 * | 12/2019 | Nishimura | H01M 8/0273 |
| 10,626,993 | B2 * | 4/2020 | Saso | B29C 45/1418 |
| 10,865,881 | B2 * | 12/2020 | Yui | F16J 15/102 |
| 11,431,004 | B2 * | 8/2022 | Yui | H01M 8/0273 |
| 2004/0149214 | A1 * | 8/2004 | Hirose | H01L 21/67126 |
| | | | | 118/715 |
| 2013/0052565 | A1 * | 2/2013 | Ridgeway | H01M 8/0223 |
| | | | | 277/312 |
| 2013/0263427 | A1 | 10/2013 | Newton | |
| 2018/0104872 | A1 * | 4/2018 | Kurano | H01M 8/0276 |
| 2018/0163869 | A1 * | 6/2018 | Saso | F16J 15/102 |
| 2018/0163870 | A1 * | 6/2018 | Saso | B29C 44/586 |
| 2018/0313448 | A1 * | 11/2018 | Nishimura | F16J 15/10 |
| 2024/0271702 | A1 * | 8/2024 | Yang | F16J 15/328 |
| 2025/0041973 | A1 * | 2/2025 | Chang | B23K 26/362 |

FOREIGN PATENT DOCUMENTS

| | | |
|---|---|---|
| KR | 10-0855879 B1 | 9/2008 |
| KR | 10-20090066046 A | 6/2009 |
| KR | 10-20150120035 A | 10/2015 |
| WO | 2018221491 A1 | 12/2018 |

OTHER PUBLICATIONS

Office Action in related application JP 2024-550198 dated Aug. 14, 2025.

* cited by examiner

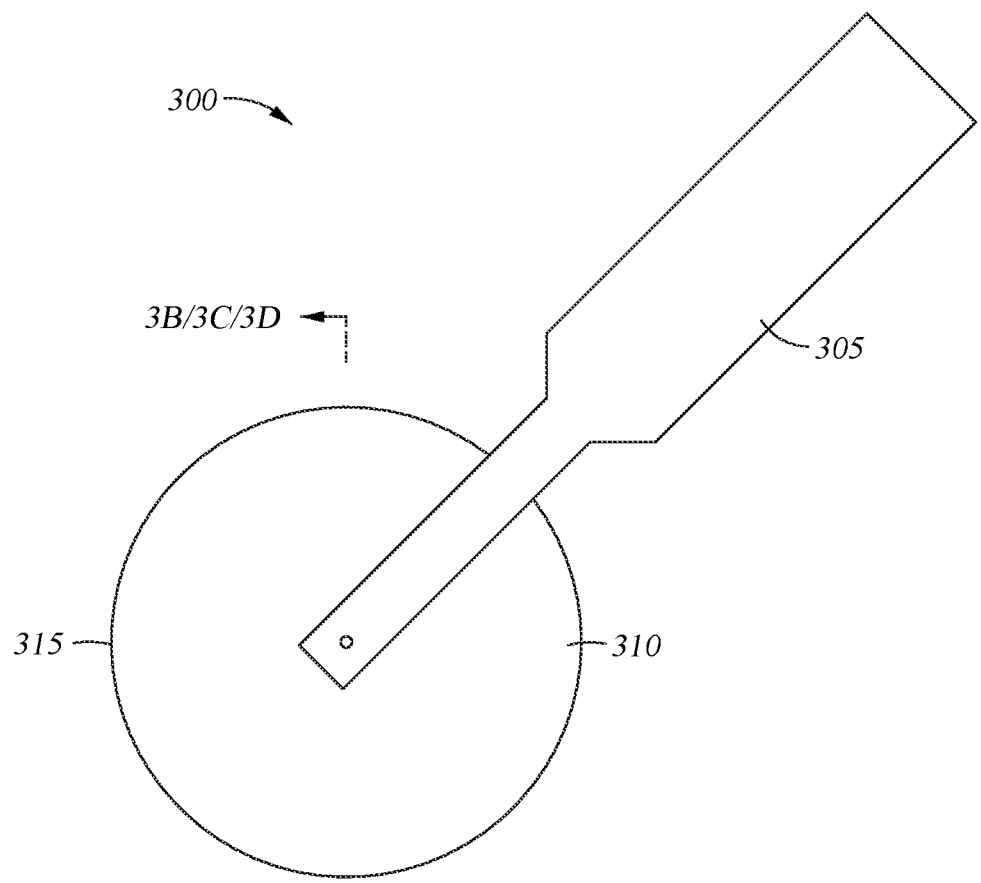
*Fig. 3A*
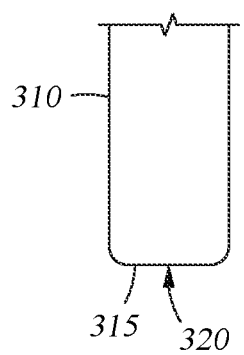 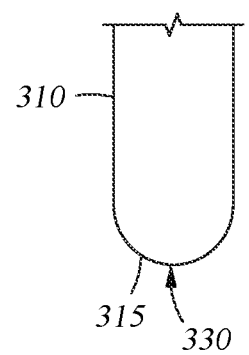 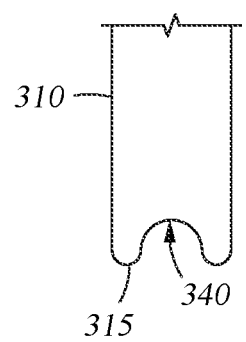
*Fig. 3B*  *Fig. 3C*  *Fig. 3D*

O-RING MOUNTING TEMPLATE AND METHOD

CROSS-REFERENCE TO RELATED APPLICATIONS

This application claims the benefit of Indian Provisional Application No. 202241010179, filed Feb. 25, 2022, which is herein incorporated by reference in its entirety.

BACKGROUND

Field

Embodiments of the present disclosure generally relate to apparatus and methods for installing a seal member, such as an o-ring, into a seal groove formed in a face of a component.

Description of the Related Art

In some equipment, such as that used for electronic chip manufacture, a face of one component is required to sealingly engage a face of another component. Typically, a seal member, such as an o-ring, installed in a seal groove formed in a face of one of the components may be several feet long, and may follow an intricate pathway, such as a spiral-shaped pathway. In some applications, the o-ring is thin and therefore is delicate. Installing a long thin o-ring uniformly into a seal groove is problematic because of the propensity for the o-ring to become stretched in some locations along the groove and compressed in other locations along the groove. Such unevenness can result in the o-ring becoming thinner at some locations along the groove and thicker or kinked at other locations along the seal groove. Consequently, the o-ring can fail to provide an effective and reliable seal when the two components are assembled. The installation of long and thin o-rings typically is performed by hand, is time-consuming, and can produce inconsistent results with respect to uniformity, as described above.

Thus, there is a need for improved tools and processes that facilitate rapid, accurate, uniform, and consistent installation of a seal member into a seal groove.

SUMMARY

The present disclosure generally relates to apparatus and methods for installing a seal member into a seal groove in a face of a component. In one implementation, a carrier is configured for facilitating transfer of a seal member to a seal groove formed in a chamber component. The carrier includes a tray including a front surface and a back surface. A holding groove is formed in the front surface, and is configured to contain the seal member. The holding groove includes a first sidewall separated from a second sidewall, the first and second sidewalls extending from the front surface to a floor. An alignment feature is formed on or in the tray. The tray is deformable in response to a pressure applied to the back surface such that the seal member is pushed out of the holding groove.

In another implementation, a method of installing a seal member into a seal groove formed in a face of a component includes placing a front surface of a carrier against the face of the component. The carrier includes a holding groove formed in the front surface, and the seal member is disposed within the holding groove. The method includes aligning the holding groove with the seal groove, and applying a pressure to a back surface of the carrier, thereby deforming the carrier and moving at least a portion of the seal member into the seal groove.

In another implementation, a method of installing a seal member into a seal groove formed in a face of a component includes placing a front surface of a carrier against the face of the component. The carrier includes a holding groove formed in the front surface, and the seal member is disposed within the holding groove. The carrier further includes a plurality of channels formed in the front surface, and the plurality of channels intersect with the holding groove. The method includes aligning the holding groove with the seal groove, and applying a pressure to a back surface of the carrier opposite each of the plurality of channels, thereby deforming the carrier and moving a plurality of portions of the seal member into the seal groove. The method further includes removing the carrier from the face of the component.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, as the disclosure may admit to other equally effective embodiments.

FIG. 3A schematically illustrates an exemplary tool used in performing the methods of the present disclosure.

FIGS. 3B-3D provide exemplary schematic cross-sectional profiles of a portion of the tool of FIG. 3A.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure concerns apparatus and methods for installing a seal member into a seal groove in a face of a component. It is contemplated that the seal member may be made from any suitable sealing material, such as an elastomer, a thermoplastic, or a metal. It is contemplated that the seal member may take any suitable form, such as an o-ring, x-ring, t-seal, v-seal, y-seal, lip seal, or the like.

Figure 1A:
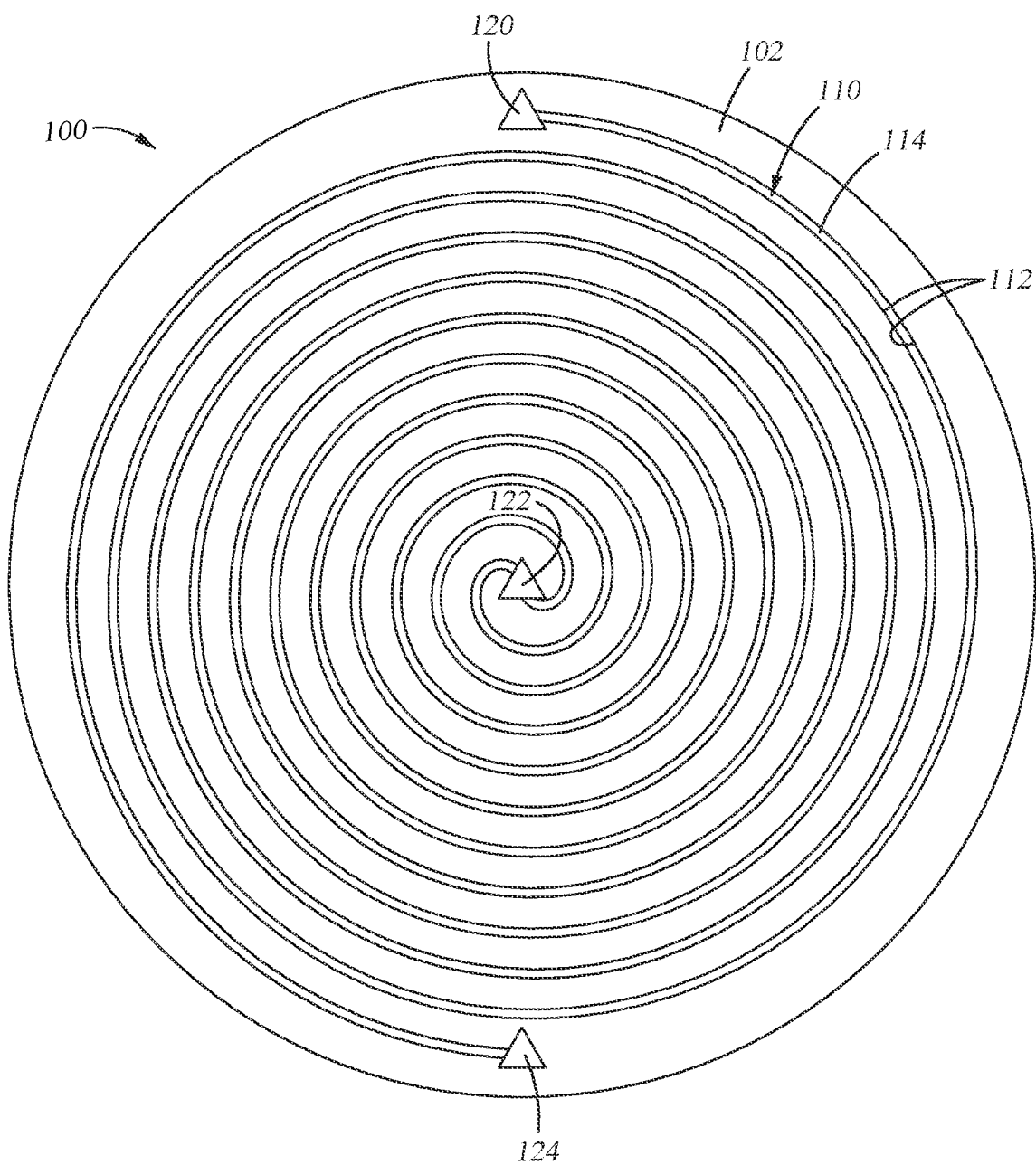
FIG. 1A is a schematic front view of a component into which a seal member is to be installed.

FIG. 1A is a schematic front view of a component 100 into which a seal member is to be installed. Some examples of component 100 include, without limitation, parts of a semiconductor processing chamber, such as a lid of a chamber, a part of gas distribution system, or a part of a heat transfer system, such as a part of a cooling circuit. Other examples include equipment associated with fluid distribution and/or heat transfer in other industries, such as in machinery for manufacturing, food processing, chemical processing, and the like. A face 102 of component 100 is configured to abut against, or otherwise mate with, another component (not shown). As illustrated, in some embodiments, the face 102 includes one or more formations 120, 122, 124. Each formation 120, 122, 124 may be in the form of a port, a recess, a cut-out, a notch, a slot, a protrusion, or any other structure or irregularity. Although three formations are depicted, it is contemplated that the face 102 may include any number of formations, such as one, two, four, five or more.

The face 102 includes a seal groove 110 that is configured to receive a seal member. The seal groove 110 includes sidewalls 112 and a floor 114. The seal groove 110 is sized and shaped to receive the seal member to provide a seal in a desired location between the component 100 and the other component when joined together. In some embodiments, it is contemplated that the seal groove 110 defines a pathway around an outer periphery of the face 102 of the component 100 only. In some embodiments, it is contemplated that the face 102 of the component 100 includes a second seal groove. In some embodiments, it is contemplated that the second seal groove does not intersect with the seal groove 110. As illustrated, in some embodiments, the seal groove 110 is arranged as a spiral pathway.

Figure 1B:
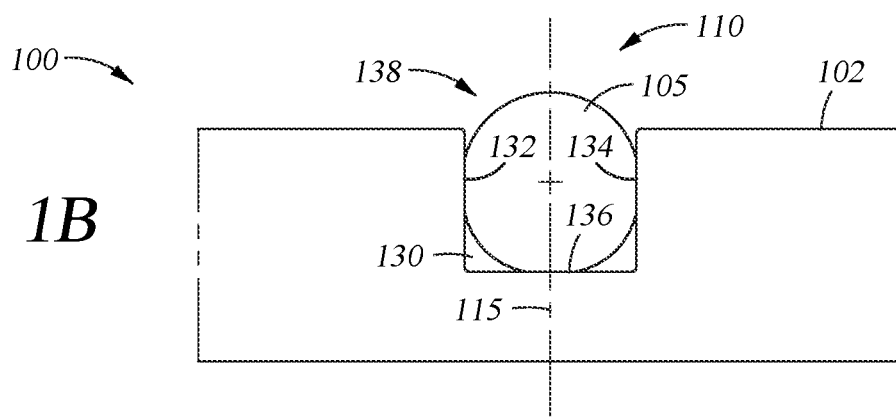
FIGS. 1B-1D provide exemplary schematic cross-sectional profiles of a groove of the component of FIG. 1A.
Figure 1C:
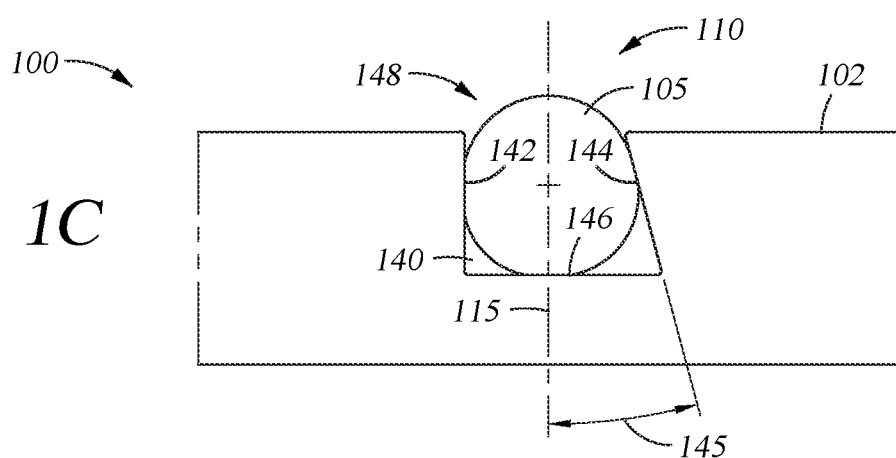
Figure 1D:
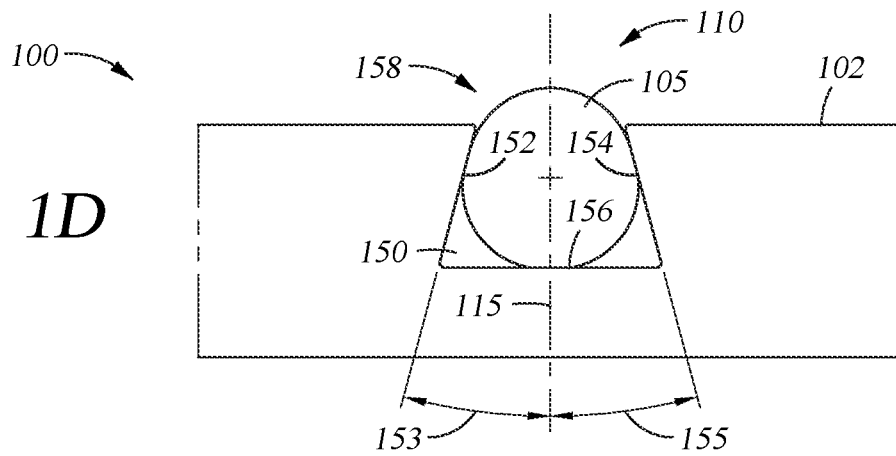

FIGS. 1B-1D provide exemplary schematic cross-sectional profiles of the seal groove 110 with seal member 105 in place after installation. The examples shown are not exhaustive, and other configurations of the seal groove 110 are contemplated. In FIG. 1B, the seal groove 110 is represented by rectangular seal groove 130. Rectangular seal groove 130 includes first and second sidewalls 132, 134 extending from a floor 136 of the rectangular seal groove 130 to an opening 138 at the face 102 of the component 100. Each of the first and second sidewalls 132, 134 are parallel to an axis 115 that is perpendicular to the face 102 of the component 100. For example, the first and second sidewalls 132, 134 extend in a direction up to eight degrees, up to six degrees, up to four degrees, or up to two degrees from the axis 115. In some embodiments, it is contemplated that a depth of the rectangular seal groove 130 from the face 102 of the component 100 to the floor 136 is less than a thickness of the seal member 105 measured parallel to the axis 115 when the seal member 105 is housed in the rectangular seal groove 130. In such embodiments, a portion of the seal member 105 protrudes through the opening 138 when installed in the rectangular seal groove 130.

In FIG. 1C, the seal groove 110 is represented by half dovetail seal groove 140. Half dovetail seal groove 140 includes a first sidewall 142 that extends parallel to the axis 115 from a floor 146 of the half dovetail seal groove 140 to an opening 148 at the face 102 of the component 100. For example, the first sidewall 142 extends in a direction up to eight degrees, up to six degrees, up to four degrees, or up to two degrees from the axis 115. Half dovetail seal groove 140 includes a second sidewall 144 that extends at an acute angle 145 to the axis 115 from the floor 146 to the opening 148 at the face 102 of the component 100. In some embodiments, it is contemplated that a depth of the half dovetail seal groove 140 from the face 102 of the component 100 to the floor 146 is less than a thickness of the seal member 105 measured parallel to the axis 115 when the seal member 105 is housed in the half dovetail seal groove 140. In such embodiments, a portion of the seal member 105 protrudes through the opening 148 when installed in the half dovetail seal groove 140.

In FIG. 1D, the seal groove 110 is represented by dovetail seal groove 150. Dovetail seal groove 150 includes a first sidewall 152 that extends at an acute angle 153 to the axis 115 from a floor 156 of the dovetail seal groove 150 to an opening 158 at the face 102 of the component 100. Dovetail seal groove 150 includes a second sidewall 154 that extends at an acute angle 155 to the axis 115 from the floor 156 to the opening 158 at the face 102 of the component 100. In some embodiments, it is contemplated that angle 153 and angle 155 are substantially equal, such as within five degrees, within four degrees, within three degrees, within two degrees, or within one degree. In other embodiments, it is contemplated that angle 153 and angle 155 are not substantially equal. In some embodiments, it is contemplated that a depth of the dovetail seal groove 150 from the face 102 of the component 100 to the floor 156 is less than a thickness of the seal member 105 measured parallel to the axis 115 when the seal member 105 is housed in the dovetail seal groove 150. In such embodiments, a portion of the seal member 105 protrudes through the opening 158 when installed in the dovetail seal groove 150.

The depictions of the seal groove 110 in FIGS. 1B-1D are exemplary. It is contemplated that the seal groove 110 may include any suitable cross-sectional shape different from those illustrated.

Figure 2A:
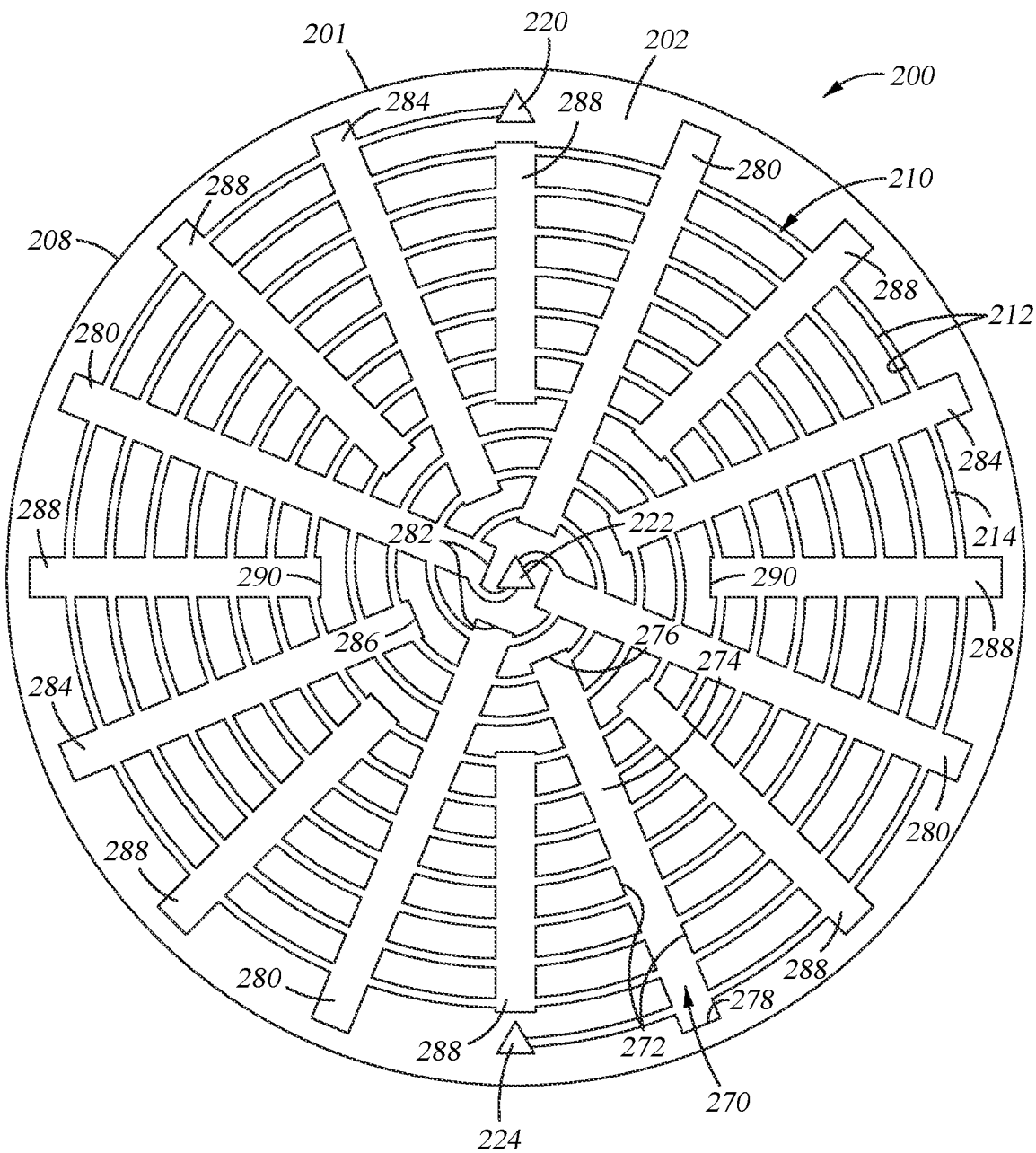
FIG. 2A is a schematic top view of a seal member carrier.
Figure 2B:
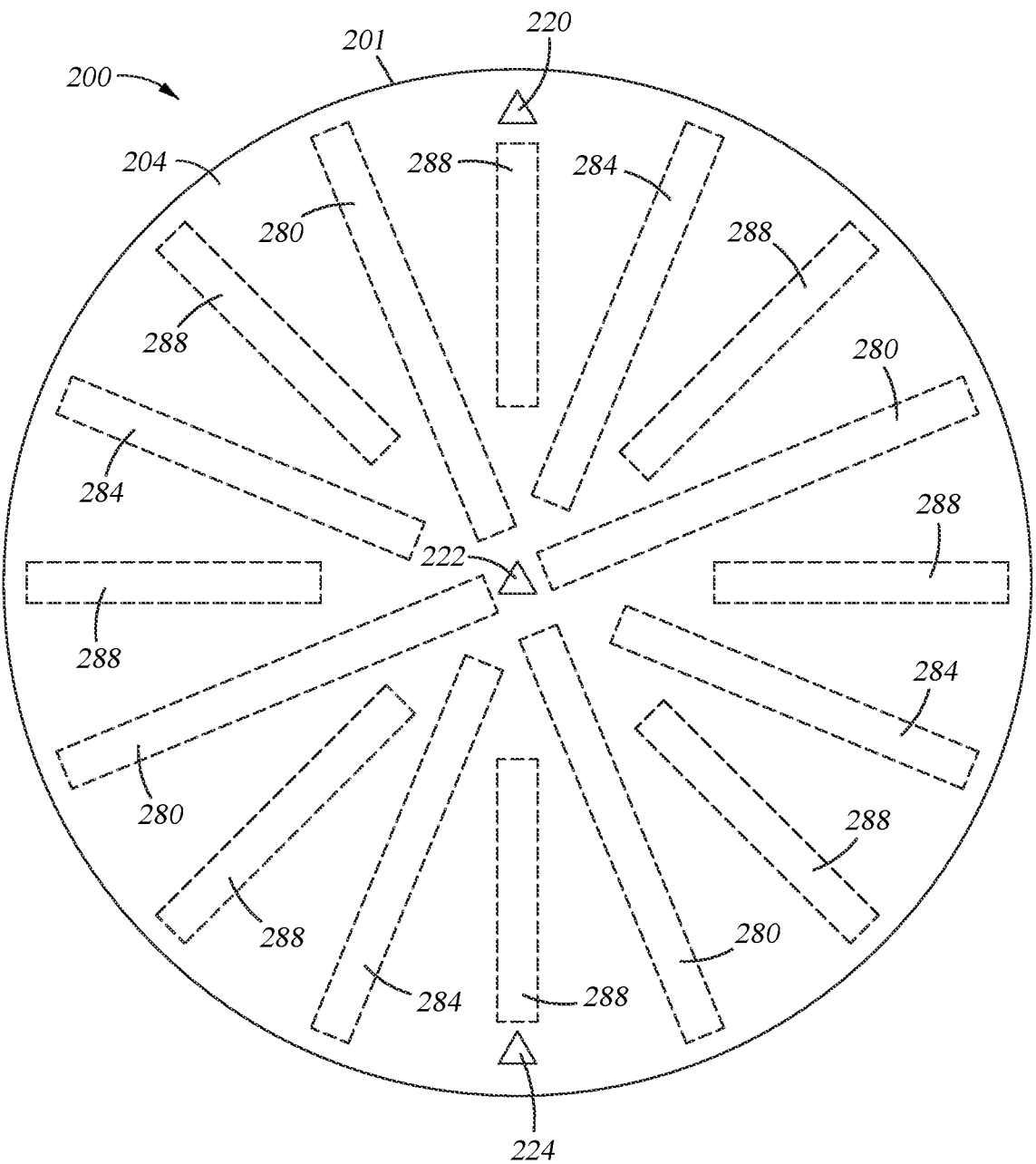
FIG. 2B is a schematic rear view of the carrier of FIG. 2A.

FIGS. 2A-2B illustrate a carrier 200 that is used during the installation of a seal member into the seal groove 110 of the component 100. FIG. 2A is a schematic top view of the carrier 200 and FIG. 2B is a schematic rear view of the carrier 200. The carrier 200 includes a tray 201 including a front surface 202 and a back surface 204. A holding groove 210 including sidewalls 212 and floor 214 is formed in the front surface 202. The holding groove 210 is sized and shaped to correspond with the seal groove 110 of the component 100, such that when the front surface 202 of the carrier 200 is placed onto the face 102 of the component 100, the holding groove 210 can be aligned to overlie the seal groove 110. In an example, the holding groove 210 describes a pathway that is substantially a mirror image of the seal groove 110. In embodiments in which the face 102 of the component 100 includes a second seal groove, it is contemplated that the carrier 200 may include a second holding groove formed in the front surface 202 that is sized and shaped to correspond with the second seal groove.

Figure 2C:
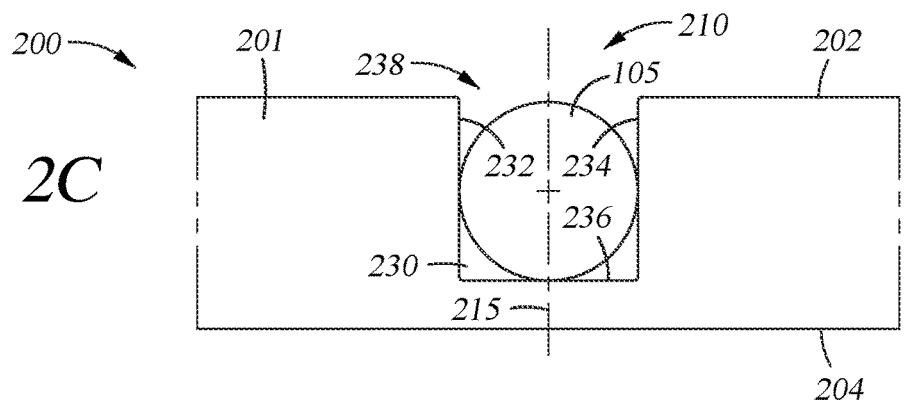
FIGS. 2C-2F provide exemplary schematic cross-sectional profiles of a groove of the carrier of FIG. 2A.

FIGS. 2C-2F provide exemplary schematic cross-sectional profiles of the holding groove 210 containing the seal member 105. The examples shown are not exhaustive, and other configurations of the holding groove 210 are contemplated. In FIG. 2C, the holding groove 210 is represented by rectangular holding groove 230. Rectangular holding groove 230 includes first and second sidewalls 232, 234 extending from a floor 236 of the rectangular holding groove 230 to an opening 238 at the front surface 202 of the carrier 200. Each of the first and second sidewalls 232, 234 are parallel to an axis 215 that is perpendicular to the front surface 202 of the carrier 200. For example, the first and second sidewalls 232, 234 extend in a direction up to eight degrees, up to six degrees, up to four degrees, or up to two degrees from the axis 215. In some embodiments, it is contemplated that a depth of the rectangular holding groove 230 from the front surface 202 of the carrier 200 to the floor 236 is greater than a thickness of the seal member 105 measured parallel to the axis 215 when the seal member 105 is housed in the rectangular holding groove 230.

Figure 2D:
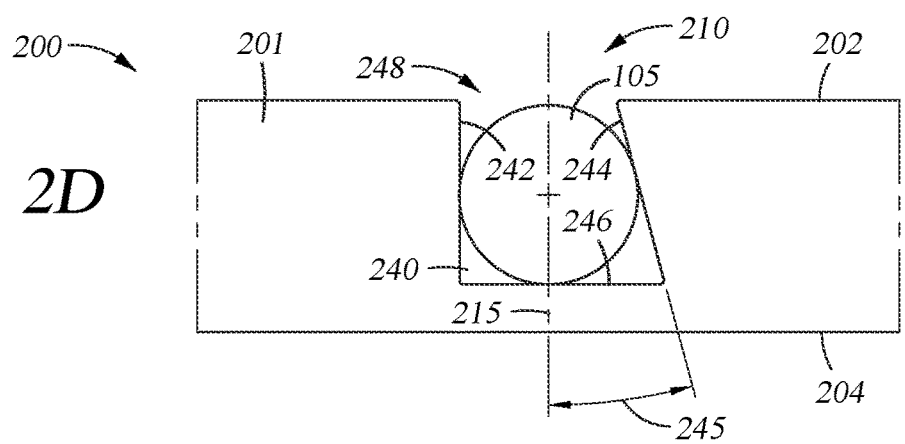

In FIG. 2D, the holding groove 210 is represented by half dovetail holding groove 240. Half dovetail holding groove 240 includes a first sidewall 242 that extends parallel to the axis 215 from a floor 246 of the half dovetail holding groove 240 to an opening 248 at the front surface 202 of the carrier 200. For example, the first sidewall 242 extends in a direction up to eight degrees, up to six degrees, up to four degrees, or up to two degrees from the axis 215. Half dovetail holding groove 240 includes a second sidewall 244 that extends at an acute angle 245 to the axis 215 from the floor 246 to the opening 248 at the front surface 202 of the carrier 200. In some embodiments, it is contemplated that a depth of the half dovetail holding groove 240 from the front surface 202 of the carrier 200 to the floor 246 is greater than a thickness of the seal member 105 measured parallel to the axis 215 when the seal member 105 is housed in the half dovetail holding groove 240.

Figure 2E:
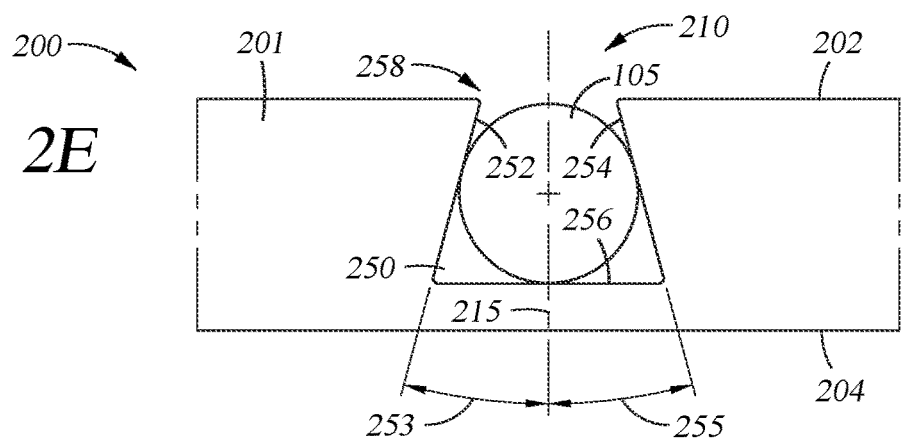

In FIG. 2E, the holding groove 210 is represented by dovetail holding groove 250. Dovetail holding groove 250 includes a first sidewall 252 that extends at an acute angle 253 to the axis 215 from a floor 256 of the dovetail holding groove 250 to an opening 258 at the front surface 202 of the carrier 200. Dovetail holding groove 250 includes a second sidewall 254 that extends at an acute angle 255 to the axis 215 from the floor 256 to the opening 258 at the front surface 202 of the carrier 200. In some embodiments, it is contemplated that angle 253 and angle 255 are substantially equal, such as within five degrees, within four degrees, within three degrees, within two degrees, or within one degree. In other embodiments, it is contemplated that angle 253 and angle 255 are not substantially equal. In some embodiments, it is contemplated that a depth of the dovetail holding groove 250 from the front surface 202 of the carrier 200 to the floor 256 is greater than a thickness of the seal member 105 measured parallel to the axis 215 when the seal member 105 is housed in the dovetail holding groove 250.

Figure 2F:
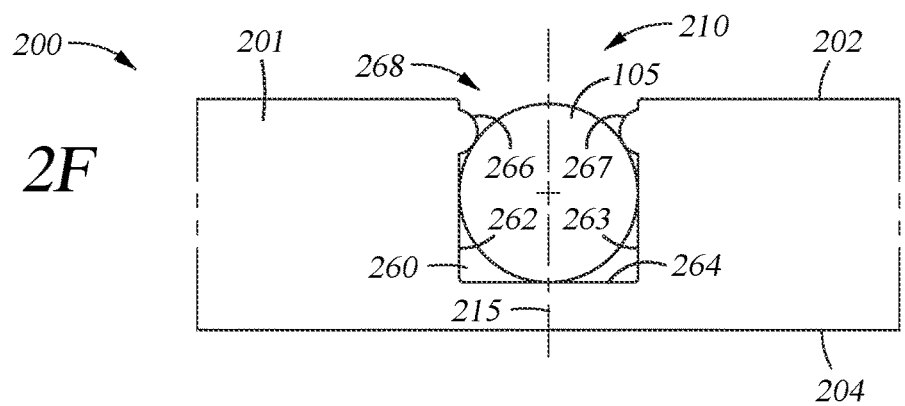

In FIG. 2F, the holding groove 210 is represented by lobed holding groove 260. Lobed holding groove 260 includes first and second sidewalls 262, 263 extending from a floor 264, of the lobed holding groove 260 to an opening 268 at the front surface 202 of the carrier 200. It is contemplated that the first sidewall 262 may extend substantially parallel to the axis 215 (as described in other embodiments, above), or at an acute angle to the axis 215, or may be curved from the floor toward the opening 258. As illustrated, the first sidewall 262 includes a first lobe 266 at the opening 268. The first lobe 266 protrudes into the lobed holding groove 260. It is contemplated that the second sidewall 263 may extend substantially parallel to the axis 215 (as described in other embodiments, above), or at an acute angle to the axis 215, or may be curved from the floor 264 toward the opening 268. As illustrated, the second sidewall 263 includes a second lobe 267 at the opening 268. The second lobe 267 protrudes into the lobed holding groove 260. In some embodiments, it is contemplated that either the first lobe 266 or the second lobe 267 may be omitted. The opening 268 has a width that is less than a width of the lobed holding groove 260 between the floor 264 and the first lobe 266 and/or between the floor 264 and the second lobe 267. In some embodiments, it is contemplated that a depth of the lobed holding groove 260 from the front surface 202 of the carrier 200 to the floor 264 is greater than a thickness of the seal member 105 measured parallel to the axis 215 when the seal member 105 is housed in the lobed holding groove 260.

The depictions of the holding groove 210 in FIGS. 2C-2F are exemplary. It is contemplated that the holding groove 210 may include any suitable cross-sectional shape different from those illustrated. Furthermore, it is contemplated that the holding groove 210 may include any combination of features of one or more of the rectangular holding groove 230, the half dovetail holding groove 240, the dovetail holding groove 250, and the lobed holding groove 260. In an example, one or more sidewall 232, 234 of the rectangular holding groove 230 may include a portion extending at an acute angle to the axis 215. In another example, one or more sidewall 242, 244, 252, 254 of the half dovetail holding groove 240 or the dovetail holding groove 250 may include a lobe at the opening 248, 258, respectively.

Referring back to FIGS. 2A-2B, in some embodiments, the carrier 200 includes one or more channel 270 formed in the front surface 202 and intersecting with the holding groove 210. Each channel 270 includes walls 272 and a floor 274. As illustrated, each channel 270 is wider than the holding groove 210. In some embodiments, it is contemplated that a depth of each channel 270 from the front surface 202 to the floor 274 is greater than a depth of the holding groove 210 from the front surface 202 to the floor 214. In some embodiments, it is contemplated that the depth of each channel 270 from the front surface 202 to the floor 274 is less than the depth of the holding groove 210 from the front surface 202 to the floor 214. In some embodiments, it is contemplated that the depth of each channel 270 from the front surface 202 to the floor 274 is equal to the depth of the holding groove 210 from the front surface 202 to the floor 214.

In some embodiments, it is contemplated that the one or more channel 270 extends radially from an inner end 276 proximal to a center 206 of the carrier 200 to an outer end 278 proximal to an edge 208 of the carrier 200. In some embodiments, it is contemplated that the one or more channel 270 is not oriented radially. In some embodiments, it is contemplated that the one or more channel 270 does not extend to a location proximal to the edge 208 of the carrier 200.

In the illustrated example, the carrier 200 includes primary radial channels 280, secondary radial channels 284, and tertiary radial channels 288. The illustrated example includes four primary radial channels 280 and four secondary radial channels 284, each secondary radial channel 284 located between a corresponding pair of primary radial channels 280. The inner end 286 of each secondary radial channel 284 is at a location further from the center 206 of the carrier 200 that the inner end 282 of each corresponding primary radial channel 280. In some embodiments, it is contemplated that the secondary radial channels 284 may be omitted.

In some embodiments, it is contemplated that a primary radial channel 280 may extend from a location proximal to the edge 208 of the carrier 200 at one side of the carrier 200, and terminate proximal to the edge 208 of the carrier 200 at another side of the carrier 200. In such embodiments, it is contemplated that the primary radial channel 280 may extend through the center 206 of the carrier 200. In some embodiments, it is contemplated that at least one primary radial channel 280 intersects with at least one other primary radial channel 280. In some embodiments, it is contemplated that at least one primary radial channel 280 does not intersect with any other primary radial channel 280.

In some embodiments, it is contemplated that at least one secondary radial channel 284 intersects with at least one primary radial channel 280. In some embodiments, it is contemplated that at least one secondary radial channel 284 does not intersect with any primary radial channel 280. In some embodiments, it is contemplated that more than one secondary radial channel 284 may be located between two corresponding primary radial channels 280. In some of such embodiments, it is contemplated that at least one secondary radial channel 284 intersects with at least one other secondary radial channel 284. Additionally, or alternatively, it is contemplated that at least one secondary radial channel 284 does not intersect with any other secondary radial channel 284.

The illustrated example includes eight tertiary radial channels 288, each tertiary radial channel 288 located between a corresponding primary radial channel 280 and a corresponding secondary radial channel 284. The inner end 290 of each tertiary radial channel 288 is at a location further from the center 206 of the carrier 200 that the inner end 286 of each corresponding secondary radial channel 284. In some embodiments, it is contemplated that the tertiary radial channels 288 may be omitted.

In some embodiments, it is contemplated that at least one tertiary radial channel 288 intersects with at least one primary radial channel 280. In some embodiments, it is contemplated that at least one tertiary radial channel 288 does not intersect with any primary radial channel 280. In some embodiments, it is contemplated that at least one tertiary radial channel 288 intersects with at least one secondary radial channel 284. In some embodiments, it is contemplated that at least one tertiary radial channel 288 does not intersect with any secondary radial channel 284.

In some embodiments, it is contemplated that more than one tertiary radial channel 288 may be located between corresponding primary 280 and/or secondary 284 radial channels. In some of such embodiments, it is contemplated that at least one tertiary radial channel 288 intersects with at least one other tertiary radial channel 288. Additionally, or alternatively, it is contemplated that at least one tertiary radial channel 288 does not intersect with any other tertiary radial channel 288.

In some embodiments, it is contemplated that the carrier 200 may include one or more alignment feature to assist the positioning of the carrier 200 on the face 102 of the component 100 such that the holding groove 210 of the carrier 200 can be aligned with the seal groove 110 of the component 100. For example, as shown in FIGS. 2A-2B the carrier 200 includes one or more alignment features 220, 222, and 224. Each alignment feature 220, 222, 224 may be in the form of a hole, a recess, a cut-out, a notch, a slot, a protrusion, or any other structure or irregularity. For example, the edge of the carrier 200 may include an indentation configured to fit against a corresponding formation associated with the component 100. Although three alignment features are depicted, it is contemplated that the carrier 200 may include any number of alignment features, such as one, two, four, five or more.

As described below, when the carrier 200 is positioned on the face 102 of the component 100 to enable transfer of a seal member from the holding groove 210 of the carrier 200 to the seal groove 110 of the component 100, alignment feature 220 is aligned with formation 120, alignment feature 222 is aligned with formation 122, and alignment feature 224 is aligned with formation 124. In some embodiments, it is contemplated that one or more of the alignment features 220, 222, 224 may be in the form of a protrusion that is sized and shaped to fit a corresponding receptacle, such as one of formations 120, 122, 124, on the face 102 of the component 100.

In some embodiments, it is contemplated that the carrier 200 may include a first alignment feature in the form of one of a hole, a recess, a cut-out, a notch, a slot, a protrusion, or other structure or irregularity; and a second alignment feature in the form of one of a hole, a recess, a cut-out, a notch, a slot, a protrusion, or other structure or irregularity that is of a different form to the form of the first alignment feature. For example, the first alignment feature may be a hole and the second alignment feature may be a protrusion.

In some embodiments, it is contemplated that the carrier 200 may include a structure or formation that serves more than one function, one such function concerning alignment of the carrier 200 on the face 102 of the component 100. For example, in embodiments in which the carrier 200 is at least partially see-through, such as by being transparent, translucent, diaphanous, or the like, an operator will be able to determine by sight whether the holding groove 210 of the carrier 200 is appropriately aligned with the seal groove 110 of the component 100. In such an example, the holding groove 210 serves a first function of containing the seal member, a second function of protecting the seal member, and a third function of assisting with the positioning of the carrier 200 on the face 102 of the component 100. In some embodiments, a feature in or on the carrier 200 that would serve only to assist in alignment of the carrier 200 on the face 102 of the component 100 may be omitted. For example, any or all of alignment feature 220, 222, 224 may be omitted.

It is contemplated that the carrier 200 may be made from a material that provides protection of a seal member from physical contact, yet is sufficiently flexible to permit one portion of the carrier 200 to be elastically deformed without another portion of the carrier 200 deforming. For example, the carrier 200 may be made from an elastomer, such as silicone. Furthermore, the material of the carrier 200 may be selected such that the carrier 200 is at least partially see-through, such as by being transparent, translucent, diaphanous, or the like, which aids in facilitating the alignment of the holding groove 210 with the seal groove 110 of the component 100. In some embodiments, it is contemplated that the carrier 200 is molded as a monolithic piece including the holding groove 210 and one or more alignment feature. In some embodiments, it is contemplated that the carrier 200 is molded as a monolithic piece including the holding groove 210, one or more channels, and one or more alignment feature.

FIG. 3A schematically illustrates an exemplary insertion tool that may be used in performing the methods of the present disclosure. In FIG. 3A, insertion tool 300 includes a handle 305 attached to a roller 310. The roller 310 is configured to rotate relative to the handle 305. In the methods described below, the roller 310 is used to apply a pressure to the carrier 200 and/or directly to the seal member. In some embodiments, the insertion tool 300 includes a shaped head instead of the roller 310.

FIGS. 3B-3D illustrate exemplary schematic cross-sectional profiles of the roller 310. In embodiments in which the insertion tool includes a shaped head instead of the roller, the shaped head may include a cross-sectional profile according to any of those depicted in FIGS. 3B-3D. Additionally, or alternatively, other cross-sectional profiles of the roller 310 and of the shaped head are contemplated. In FIG. 3B, a contact surface 315 of the roller 310 includes a straight portion 320. In FIG. 3C, the contact surface 315 of the roller 310 includes a rounded portion 330. In FIG. 3D, the contact surface 315 of the roller 310 includes an indented portion 340.

Figure 4:
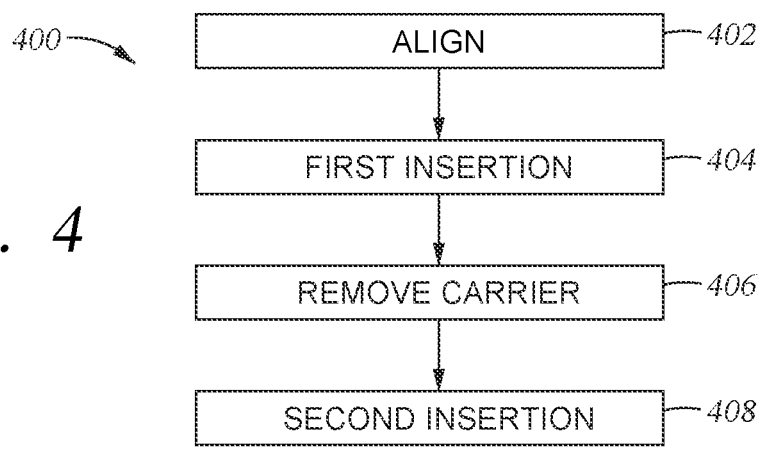
FIGS. 4-6 provide exemplary methods of the present disclosure.
Figure 5:
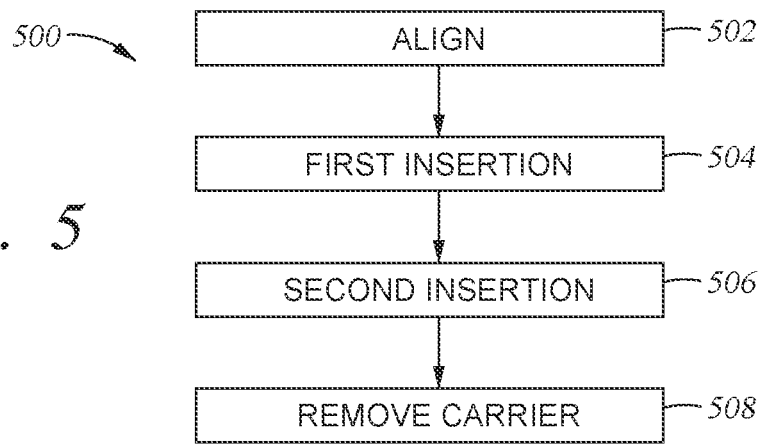
Figure 6:
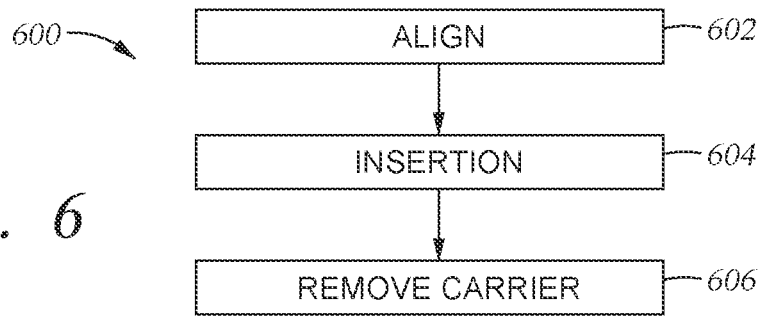

FIGS. 4-6 provide exemplary methods of use of the carrier 200 to insert a seal member into the seal groove 110 of component 100. As a precursor to each method of FIGS. 4-6, a seal member is pre-installed in the holding groove 210 of the carrier 200, and the carrier 200 is placed onto the component 100 such that the front surface 202 of the carrier 200 is against the face 102 of the component 100. In some embodiments, it is contemplated that the seal member may be housed in the holding groove 210 together with a spacer member. The spacer member may be made from a polymer such as polytetrafluoroethylene (PTFE). In such embodiments, the methods of the present disclosure may be applied to transfer the seal member and the spacer member together into the seal groove 110.

Referring to FIG. 4, the method commences at operation 402 by aligning the carrier 200 with the component 100 such that the holding groove 210 of the carrier 200 overlies the seal groove 110 of the component 100. In some embodiments, alignment of the holding groove 210 of the carrier 200 with the seal groove 110 of the component 100 is achieved by orienting the carrier 200 such that alignment feature 220 overlies formation 120, and/or alignment feature 222 overlies formation 122, and/or alignment feature 224 overlies formation 124. In some embodiments, such as when any one or more of formations 120, 122, 124 is a port, a recess, or a slot, and a corresponding alignment feature 220, 222, 224 is a hole or a slot, it is contemplated that a peg may be inserted through any of alignment feature 220, 222, 224 into the corresponding formation 120, 122, 124, respectively.

In embodiments in which at least one alignment feature 220, 222, 224 of the carrier 200 is a protrusion, alignment of the holding groove 210 of the carrier 200 with the seal groove 110 of the component 100 is achieved by orienting the carrier 200 such that the protrusion is inserted into a corresponding formation 120, 122, 124, or into another receptacle of the component 100. In embodiments in which at least one formation 120, 122, 124 of component 100 is a protrusion, alignment of the holding groove 210 of the carrier 200 with the seal groove 110 of the component 100 is achieved by orienting the carrier 200 such that the protrusion is inserted into a corresponding alignment feature 220, 222, 224, or into another receptacle of the carrier 200. In embodiments in which the carrier 200 is at least partially see-through, such as by being transparent, translucent, diaphanous, or the like, alignment of the holding groove 210 of the carrier 200 with the seal groove 110 of the component 100 is achieved by orienting the carrier 200 such that an operator then confirms alignment by sight.

In some embodiments, it is contemplated that alignment of the holding groove 210 of the carrier 200 with the seal groove 110 of the component 100 is achieved by mating an alignment feature 220, 222, 224 of the carrier 200 against a corresponding formation 120, 122, 124 associated with the component 100 that is shaped and sized to engage the alignment feature 220, 222, 224. In some embodiments, it is contemplated that aligning the carrier 200 with the component 100 such that the holding groove 210 of the carrier 200 overlies the seal groove 110 of the component 100 is achieved by any one or more of the above-described methods.

In some embodiments, it is contemplated that once the holding groove 210 of the carrier 200 overlies the seal groove 110 of the component 100, the carrier 200 may be secured in place. In one example, a load may be applied to the carrier 200 against the component 100. In another example, the carrier 200 may be temporarily adhered to the component 100 by tape and/or an adhesive. In a further example, the carrier 200 may be clamped to the component 100. In yet another example, one or more of formation 120, 122, 124 is a port, and the carrier 200 is secured to the component 100 by applying a vacuum through the one or more of formation 120, 122, 124 if the corresponding alignment feature 220, 222, 224, respectively, of the carrier 200 is not a hole, or is omitted.

Figure 7:
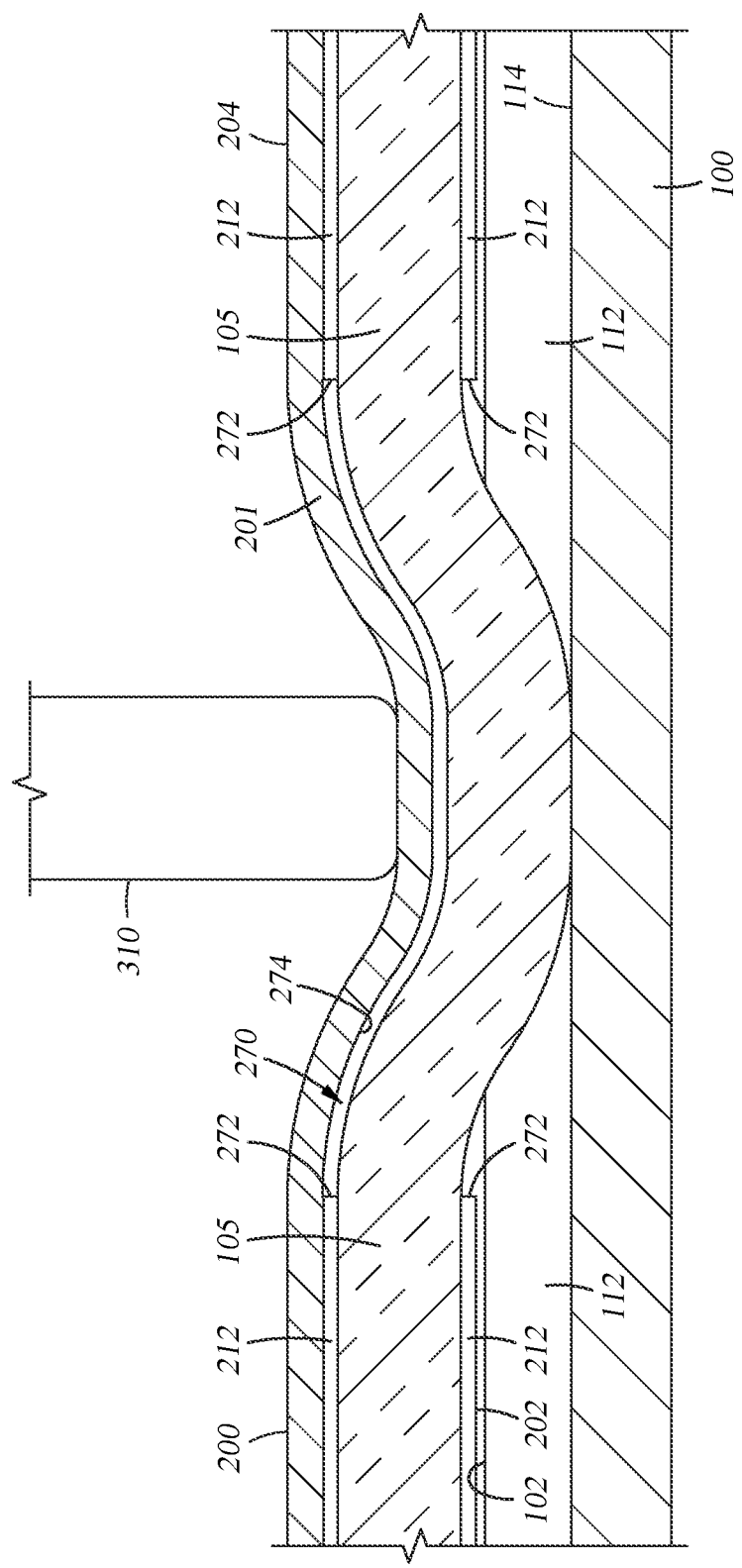
FIG. 7 is a cross-sectional view schematically illustrating an operation in the methods of FIGS. 4 and 5.

At operation 404, a first insertion of the seal member into the seal groove 110 of the component 100 is performed. Insertion tool 300 is pressed against the back surface 204 of the carrier 200 opposite each channel 270. The carrier 200 deforms under the pressure applied by the insertion tool 300, and a portion of the seal member under the insertion tool 300 is transferred to the seal groove 110 of the component 100. FIG. 7 is a cross-sectional view schematically illustrating the transfer of a portion of seal member 105 into the seal groove 110 of the component 100. Pressure applied by the roller 310 of the insertion tool 300 has locally deformed the carrier 200 to push a portion of the seal member 105 into the seal groove 110. In some embodiments, it is contemplated that the insertion tool 300 includes a roller 310 or a shaped head that includes a cross-sectional profile according to that shown in FIG. 3B.

It is contemplated that the insertion tool 300 may be moved back and forth on the back surface 204 of the carrier 200 against each channel 270 while pressing against the carrier 200. In some embodiments, it is contemplated that the back-and-forth motion may commence proximal to the center 206 of the carrier 200. Where part of the seal member 105 crosses a channel 270 of the carrier 200, at least a portion of the seal member 105 is inserted into the seal groove 110 of the component 100. In some embodiments, the first insertion of operation 404 may be performed by applying the insertion tool 300 to the back surface 204 of the carrier 200 at the channel 270 without being moved back and forth.

With reference to FIG. 2B, in embodiments in which the carrier 200 includes channels oriented radially, it is contemplated that the first insertion may be performed by applying pressure via the insertion tool 300 to the back surface 204 of the carrier 200 at each radial channel 280, 284, 288 in a predetermined sequence. In an example, the insertion tool 300 applies pressure to the back surface 204 of the carrier 200 at each primary radial channel 280, then at each secondary radial channel 284, then at each tertiary radial channel 288. In another example, the insertion tool 300 applies pressure to the back surface 204 of the carrier 200 first at any radial channel 280, 284, 288, then at successive radial channels 280, 284, 288 in a clockwise (or anticlockwise) direction. In a further example, the insertion tool 300 applies pressure to the back surface 204 of the carrier 200 in a sector-by-sector sequence. For instance, a first primary radial channel 280 may be at the 12 o'clock position and a second primary radial channel 280 may be at the 3 o'clock position. The insertion tool 300 may apply pressure to the back surface 204 of the carrier 200 at the first primary radial channel 280, then at the second primary radial channel 280, then at any secondary and tertiary radial channels 284, 288 located between the first and second primary radial channels 280.

By applying pressure via the insertion tool 300 to the back surface 204 of the carrier 200 at each channel 270 as shown in FIG. 7, one or more portions of the seal member 105 are transferred from the carrier 200 to the seal groove 110 of the component 100. When pressure from the application of the insertion tool 300 is released, the carrier 200 elastically returns toward an undeformed state, leaving the transferred portions of the seal member 105 in the seal groove 110 of the component 100. Other portions of the seal member 105 remain in the holding groove 210 of the carrier 200.

Returning to FIG. 4, at operation 406, the carrier 200 is removed from the face 102 of the component 100. In embodiments in which the carrier 200 has been secured to the component 100, the securing mechanism—such as tape, a clamp, a load, or a vacuum—is removed or disabled. In some embodiments, it is contemplated that the operator may peel the carrier 200 away from the component 100. It is further contemplated that the portions of the seal member 105 within the seal groove 110 anchor the seal member 105 in place such that portions of the seal member 105 remaining in the holding groove 210 after operation 404 are pulled out of the holding groove 210 during operation 406. After removal of the carrier 200, some portions of the seal member 105 lay within the seal groove 110 of the component 100, and other portions of the seal member 105 lay on the face 102 of the component 100 above the seal groove 110.

At operation 408, a second insertion of the seal member 105 into the seal groove 110 of the component 100 is performed. Insertion tool 300 is pressed against portions of the seal member 105 laying on the face 102 of the component 100 above the seal groove 110 to insert those portions of the seal member 105 into the seal groove 110.

Figure 8A:
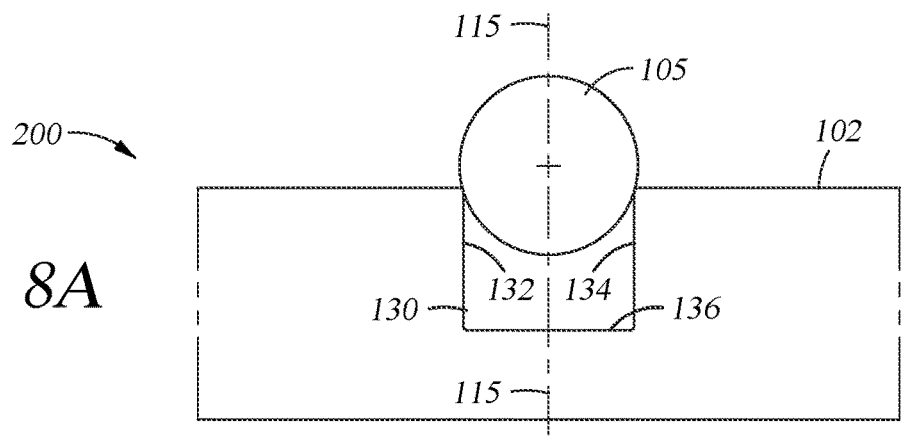
FIGS. 8A-8C provide exemplary schematic cross-sectional illustrations of an operation in the method of FIG. 4.
Figure 8B:
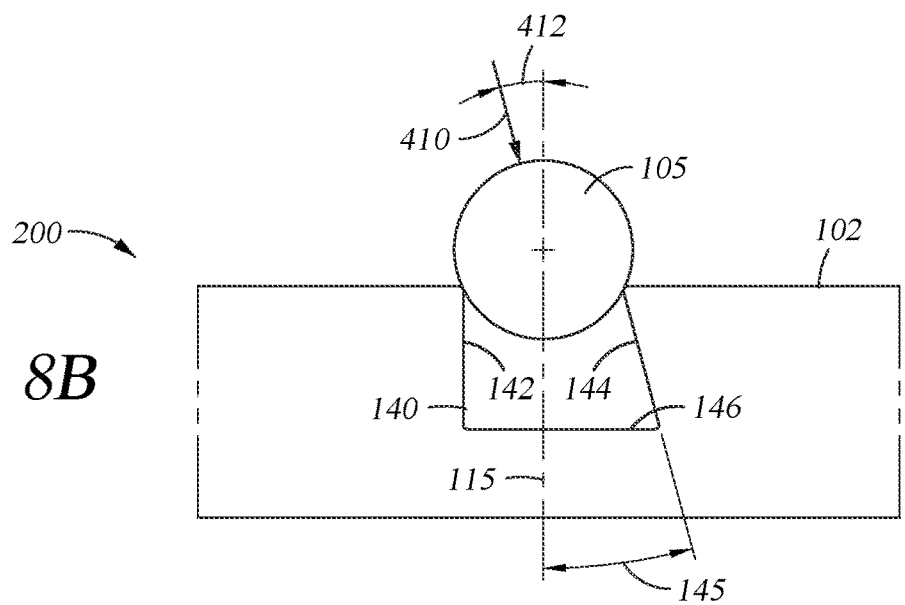
Figure 8C:
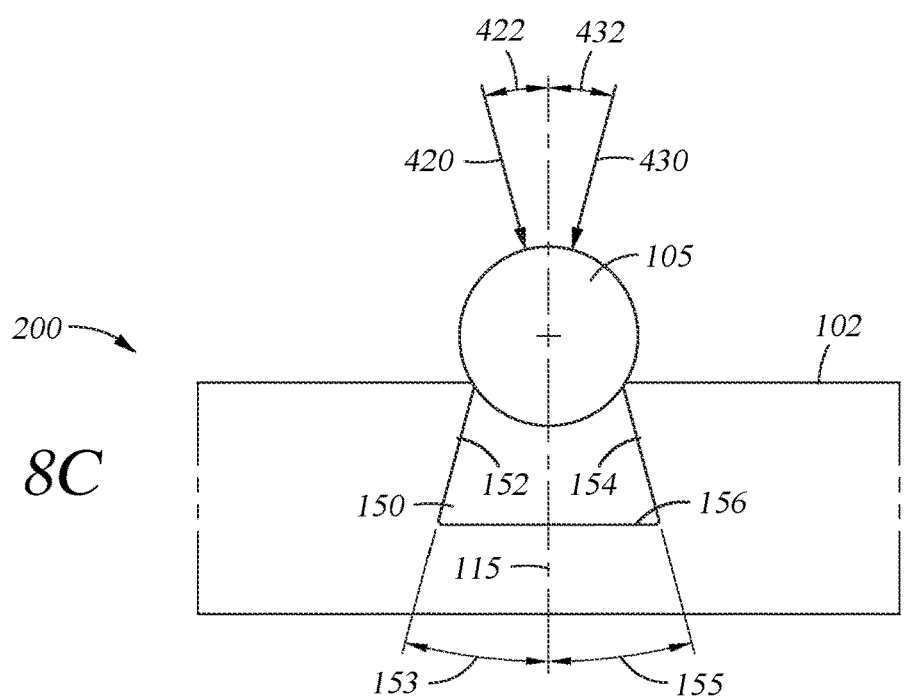

FIGS. 8A-8C provide exemplary schematic cross-sectional illustrations of seal member 105 undergoing insertion into differing profiles of seal groove 110 at operation 408. FIG. 8A illustrates the rectangular seal groove 130 of FIG. 1B. As described above, axis 115 is perpendicular to the face 102 of the component 100. In some embodiments, it is contemplated that the insertion tool 300 (FIG. 3A) includes a roller 310 or a shaped head that includes a cross-sectional profile according to that shown in FIG. 3B, FIG. 3C, or FIG. 3D. At operation 408, pressure is applied via the insertion tool 300 to the seal member 105 in a direction substantially along the axis 115, such as in a direction up to eight degrees, up to six degrees, up to four degrees, or up to two degrees from the axis 115. In some embodiments, it is contemplated that the insertion tool 300 is moved along the rectangular seal groove 130 while pressing the seal member 105 into the rectangular seal groove 130. In some embodiments, it is contemplated that once a portion of the seal member 105 has been inserted into the rectangular seal groove 130, pressure applied by the insertion tool 300 to that inserted portion of the seal member 105 is reduced or removed before moving the insertion tool 300 to another portion of the seal member 105.

FIG. 8B illustrates the half dovetail seal groove 140 of FIG. 1C. As described above, axis 115 is perpendicular to the face 102 of the component 100. In some embodiments, it is contemplated that the insertion tool 300 (FIG. 3A) includes a roller 310 or a shaped head that includes a cross-sectional profile according to that shown in FIG. 3B, FIG. 3C, or FIG. 3D. In some embodiments, at operation, pressure is applied via the insertion tool 300 to the seal member 105 in a direction substantially along the axis 115, such as in a direction up to eight degrees, up to six degrees, up to four degrees, or up to two degrees from the axis 115. In some embodiments, it is contemplated that the insertion tool 300 is moved along the half dovetail seal groove 140 while pressing the seal member 105 into the half dovetail seal groove 140 in the direction substantially along the axis 115. In some embodiments, it is contemplated that once a portion of the seal member 105 has been inserted into the half dovetail seal groove 140, pressure applied by the insertion tool 300 to that inserted portion of the seal member 105 is reduced or removed before moving the insertion tool 300 to another portion of the seal member 105.

Additionally, or alternatively, pressure is applied via the insertion tool 300 to the seal member 105 in a direction depicted by arrow 410. In some embodiments, it is contemplated that the insertion tool 300 here includes a roller 310 or a shaped head that includes a cross-sectional profile according to that shown in FIG. 3C. Arrow 410 is at an acute angle 412 to the axis 115. In some embodiments, it is contemplated that angle 412 and angle 145 of the second sidewall 144 of the half dovetail seal groove 140 with respect to the axis 115 are substantially equal, such as within five degrees, within four degrees, within three degrees, within two degrees, or within one degree. In other embodiments, it is contemplated that angle 412 and angle 145 are not substantially equal. In some embodiments, it is contemplated that the insertion tool 300 is moved along the half dovetail seal groove 140 while pressing the seal member 105 into the half dovetail seal groove 140 in the direction of arrow 410. In some embodiments, it is contemplated that once a portion of the seal member 105 has been inserted into the half dovetail seal groove 140, pressure applied by the insertion tool 300 to that inserted portion of the seal member 105 is reduced or removed before moving the insertion tool 300 to another portion of the seal member 105.

FIG. 8C illustrates the dovetail seal groove 150 of FIG. 1D. As described above, axis 115 is perpendicular to the face 102 of the component 100. In some embodiments, it is contemplated that the insertion tool 300 includes a roller 310 or a shaped head that includes a cross-sectional profile according to that shown in FIG. 3C. At operation, pressure is applied via the insertion tool 300 to the seal member 105 in a direction depicted by arrow 420. Arrow 420 is at an acute angle 422 to the axis 115. In some embodiments, it is contemplated that angle 422 and angle 153 of the first sidewall 152 of the dovetail seal groove 150 with respect to the axis 115 are substantially equal, such as within five degrees, within four degrees, within three degrees, within two degrees, or within one degree. In other embodiments, it is contemplated that angle 422 and angle 153 are not substantially equal. In some embodiments, it is contemplated that the insertion tool 300 is moved along the dovetail seal groove 150 while pressing the seal member 105 into the dovetail seal groove 150 in the direction of arrow 420. In some embodiments, it is contemplated that once a portion of the seal member 105 has been inserted into the dovetail seal groove 150, pressure applied by the insertion tool 300 to that inserted portion of the seal member 105 is reduced or removed before moving the insertion tool 300 to another portion of the seal member 105.

Additionally, or alternatively, pressure is applied via the insertion tool 300 to the seal member 105 in a direction depicted by arrow 430. In some embodiments, it is contemplated that the insertion tool 300 includes a roller 310 or a shaped head that includes a cross-sectional profile according to that shown in FIG. 3C. Arrow 430 is at an acute angle 432 to the axis 115. In some embodiments, it is contemplated that angle 432 and angle 155 of the second sidewall 154 of the dovetail seal groove 150 with respect to the axis 115 are substantially equal, such as within five degrees, within four degrees, within three degrees, within two degrees, or within one degree. In other embodiments, it is contemplated that angle 432 and angle 155 are not substantially equal. In some embodiments, it is contemplated that the insertion tool 300 is moved along the dovetail seal groove 150 while pressing the seal member 105 into the dovetail seal groove 150 in the direction of arrow 430. In some embodiments, it is contemplated that once a portion of the seal member 105 has been inserted into the dovetail seal groove 150, pressure applied by the insertion tool 300 to that inserted portion of the seal member 105 is reduced or removed before moving the insertion tool 300 to another portion of the seal member 105.

During and/or after operation 408, in some embodiments, it is contemplated that method 400 may continue with an inspection of the seal member 105 installed in the seal groove 110 of the component 100. In some embodiments, it is contemplated that method 400 may then continue with an adjustment of the seal member 105 as needed, such as by repeating operation 408 at one or more discrete portions of the seal member 105.

Referring now to FIG. 5, a method 500 commences at operation 502 by aligning the carrier 200 with the component 100 such that the holding groove 210 of the carrier 200 overlies the seal groove 110 of the component 100. Operation 502 is the same as operation 402 of method 400, and therefore the above description concerning operation 402 applies also to operation 502 of method 500.

At operation 504, a first insertion of the seal member 105 into the seal groove 110 of the component 100 is performed. Operation 504 is the same as operation 404 of method 400, and therefore the above description concerning operation 404, including references to FIGS. 7 and 2A-2B, applies also to operation 504 of method 500.

At operation 506, a second insertion of the seal member 105 into the seal groove 110 of the component 100 is performed. An insertion tool 300 is pressed against the back surface 204 of the carrier 200 opposite the holding groove 210. The carrier 200 deforms under the pressure applied by the insertion tool 300, and a portion of the seal member 105 under the insertion tool 300 is pushed out of the holding groove 210, and transferred to the seal groove 110 of the component 100. In some embodiments, it is contemplated that the insertion tool 300 includes a roller 310 or a shaped head that includes a cross-sectional profile according to that shown in FIG. 3B, FIG. 3C, or FIG. 3D. In some embodiments, pressure is applied via the insertion tool 300 to the back surface 204 of the carrier 200 in a direction substantially along the axis 115 (FIGS. 1B-1D), such as in a direction up to eight degrees, up to six degrees, up to four degrees, or up to two degrees from the axis 115. In some embodiments, it is contemplated that the insertion tool 300 is moved along the carrier 200, following the holding groove 210, while pressing the seal member 105 into the seal groove 110. In some embodiments, it is contemplated that once a portion of the seal member 105 has been inserted into the seal groove 110, pressure applied by the insertion tool 300 to the carrier 200 is reduced or removed before moving the insertion tool 300 to another part of the carrier 200 to transfer another portion of the seal member 105 into the seal groove 110.

At operation 508, the carrier 200 is removed from the face 102 of the component 100. Operation 508 is the same as operation 406 of method 400, and therefore the above description concerning operation 406 applies also to operation 508 of method 500.

After operation 508, in some embodiments, it is contemplated that method 500 may continue with an inspection of the seal member 105 installed in the seal groove 110 of the component 100. In some embodiments, it is contemplated that method 500 may then continue with an adjustment of the seal member 105 as needed, such as by applying the insertion tool 300 to the seal member 105, as per operation 408 of method 400. In such embodiments, it is contemplated that the insertion tool 300 may be applied to the entire seal member 105 or to one or more discrete portions of the seal member 105.

Referring now to FIG. 6, a method 600 commences at operation 602 by aligning the carrier 200 with the component 100 such that the holding groove 210 of the carrier 200 overlies the seal groove 110 of the component 100. Operation 602 is the same as operation 402 of method 400, and therefore the above description concerning operation 402 applies also to operation 602 of method 600.

At operation 604, the seal member 105 is inserted into the seal groove 110 of the component 100. Operation 604 is the same as operation 506 of method 500, and therefore the above description concerning operation 506 applies also to operation 604 of method 600. In some embodiments, it is contemplated that the carrier 200 used in method 600 may not include radial channels 280, 284, 288. In some embodiments, it is contemplated that the carrier 200 used in method 600 may include one or more other channels 270. In such embodiments, the method 600 may include an operation of applying pressure to the back surface 204 of the carrier 200 opposite the one or more other channel 370 to transfer one or more portion of the seal member 105 into the seal groove 110 of the component 100. In other embodiments, it is contemplated that the carrier 200 used in method 600 may not include any channels 370.

At operation 606, the carrier 200 is removed from the face 102 of the component 100. Operation 606 is the same as operation 406 of method 400, and therefore the above description concerning operation 406 applies also to operation 606 of method 600.

After operation 606, in some embodiments, it is contemplated that method 600 may continue with an inspection of the seal member 105 installed in the seal groove 110 of the component 100. In some embodiments, it is contemplated that method 600 may then continue with an adjustment of the seal member 105 as needed, such as by applying the insertion tool 300 to the seal member 105, as per operation 408 of method 400. In such embodiments, it is contemplated that the insertion tool 300 may be applied to the entire seal member 105 or to one or more discrete portions of the seal member 105.

In some embodiments, it is contemplated that the holding groove 210 of the carrier 200 may be configured to mitigate a risk of damaging the seal member 105 when the seal member 105 is transferred to the seal groove 110 of the component 100 during operation 506 of method 500 or during operation 604 of method 600. For example, a risk of damage to the seal member 105 may occur if the seal member 105 becomes pinched at the opening 158 of the dovetail seal groove 150 of the component 100 during transfer from the holding groove 210 of the carrier 200. Such a risk may be mitigated by appropriate selection of the width of the opening (such as opening 238, 248, 258, 268) of the holding groove 210 of the carrier 200 and/or appropriate selection of the cross-sectional profile of the holding groove 210 of the carrier 200.

FIGS. 9A-9D provide exemplary schematic cross-sectional illustrations demonstrating how the holding groove 210 of the carrier 200 can be configured and positioned to mitigate a risk of damaging the seal member 105 during the transfer of the seal member 105 from the holding groove 210 to the seal groove 110 of the component 100.

Figure 9A:
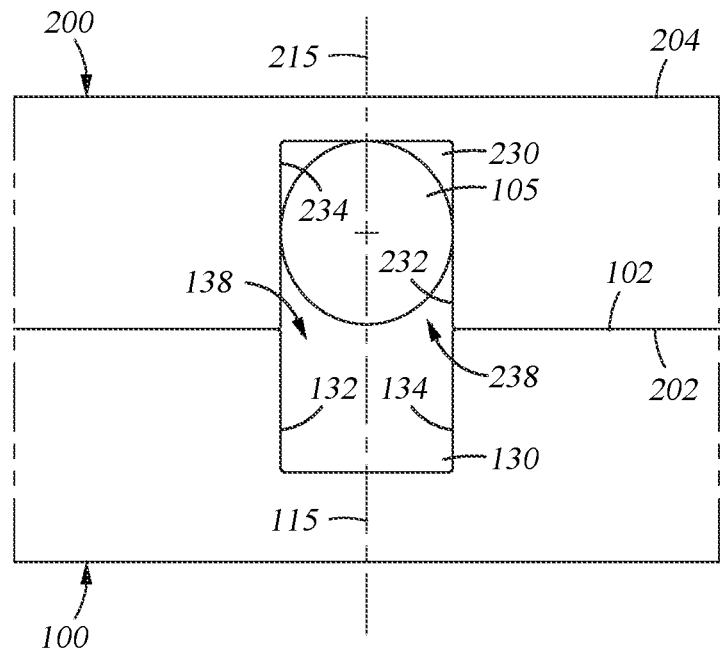
FIGS. 9A-9D provide exemplary schematic cross-sectional illustrations of an operation in the methods of FIGS. 5 and 6.

FIG. 9A illustrates the rectangular seal groove 130 of FIG. 1B and the rectangular holding groove 230 of FIG. 2C. As described above, axis 115 is perpendicular to the face 102 of the component 100, and axis 215 is perpendicular to the front surface 202 of the carrier 200. As illustrated, axis 115 is parallel to axis 215. The front surface 202 of the carrier 200 is disposed on the face 102 of the component 100. The opening 238 of the rectangular holding groove 230 of the carrier 200 is aligned with the opening 138 of the rectangular seal groove 130 of the component 100. A width of the opening 238 of the rectangular holding groove 230 is selected to be less than or equal to a width of the opening 138 of the rectangular seal groove 130. During operation 506 of method 500 or during operation 604 of method 600, when pressure is applied via the insertion tool 300 to the back surface 204 of the carrier 200 in a direction substantially along the axis 115 (as described above), the relative size of the openings 138, 238 and the alignment of the openings 138, 238 facilitate a damage-free transfer of the seal member 105 into the rectangular seal groove 130 of the component 100.

Figure 9B:
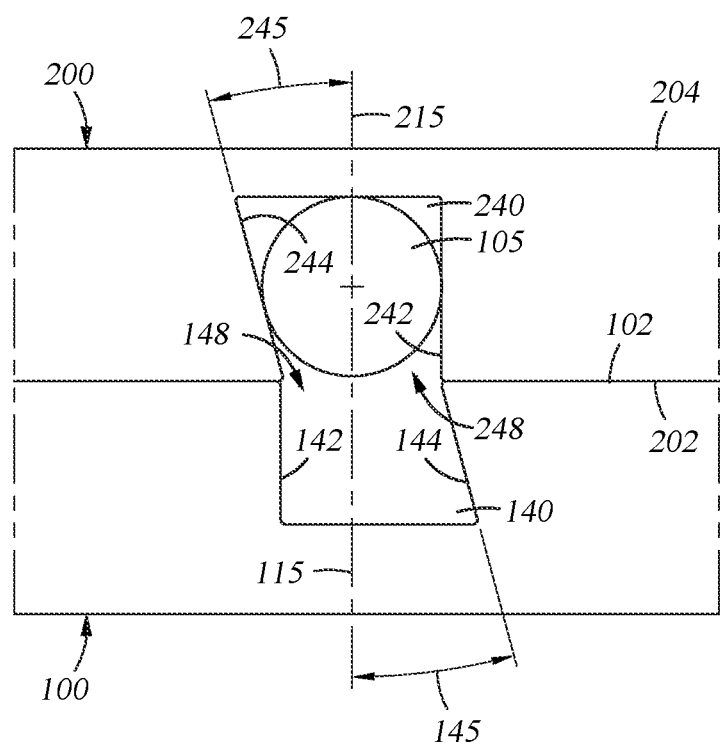

FIG. 9B illustrates the half dovetail seal groove 140 of FIG. 1C and the half dovetail holding groove 240 of FIG. 2D. As described above, axis 115 is perpendicular to the face 102 of the component 100, and axis 215 is perpendicular to the front surface 202 of the carrier 200. As illustrated, axis 115 is parallel to axis 215. The front surface 202 of the carrier 200 is disposed on the face 102 of the component 100. The opening 248 of the half dovetail holding groove 240 of the carrier 200 is aligned with the opening 148 of the half dovetail seal groove 140 of the component 100. A width of the opening 248 of the half dovetail holding groove 240 is selected to be less than or equal to a width of the opening 148 of the half dovetail seal groove 140. During operation 506 of method 500 or during operation 604 of method 600, when pressure is applied via the insertion tool 300 to the back surface 204 of the carrier 200 in a direction substantially along the axis 115 (as described above), the relative size of the openings 148, 248 and the alignment of the openings 148, 248 facilitate a damage-free transfer of the seal member 105 into the half dovetail seal groove 140 of the component 100.

In the illustrated example, the first sidewall 242 of the half dovetail holding groove 240 is disposed proximal to the second sidewall 144 of the half dovetail seal groove 140. As described above, the first sidewall 242 of the half dovetail holding groove 240 is substantially parallel to the axis 115. The second sidewall 144 of the half dovetail seal groove 140 extends at the acute angle 145 to the axis 115. Additionally, the second sidewall 244 of the half dovetail holding groove 240 is disposed proximal to the first sidewall 142 of the half dovetail seal groove 140. The second sidewall 244 of the half dovetail holding groove 240 extends at the acute angle 245 to the axis 215. As described above, the first sidewall 142 of the half dovetail seal groove 140 is substantially parallel to the axis 115. It is contemplated that in the illustrated example, when pressure is applied via the insertion tool 300 to the back surface 204 of the carrier 200 in a direction substantially along the axis 115 (as described above), the second sidewall 244 of the half dovetail holding groove 240 guides the seal member 105 toward a portion of the half dovetail seal groove 140 bounded by the second sidewall 144 of the half dovetail seal groove 140.

In some embodiments, it is contemplated that angle 145 and angle 245 are substantially equal, such as within five degrees, within four degrees, within three degrees, within two degrees, or within one degree. In other embodiments, it is contemplated that angle 145 and angle 245 are not substantially equal.

Figure 9C:
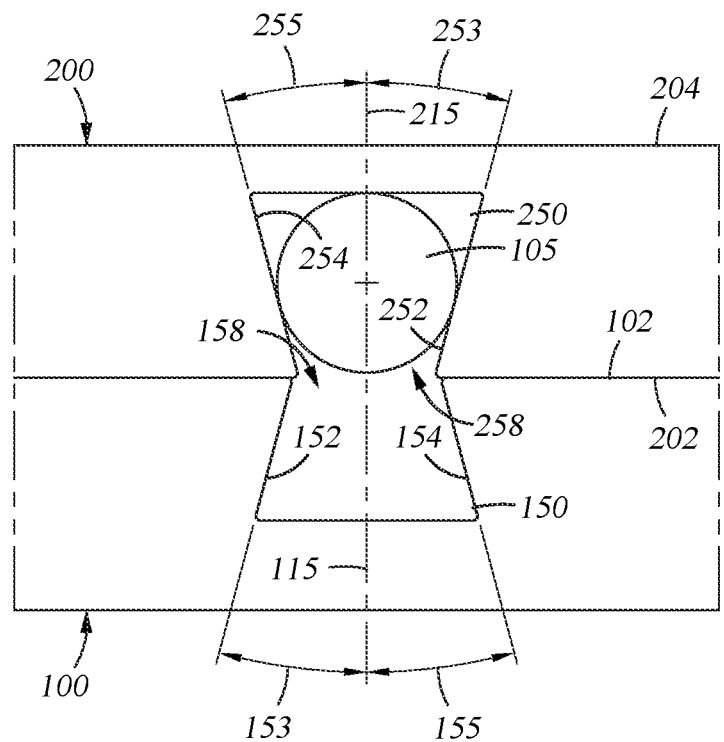

FIG. 9C illustrates the dovetail seal groove 150 of FIG. 1D and the dovetail holding groove 250 of FIG. 2E. As described above, axis 115 is perpendicular to the face 102 of the component 100, and axis 215 is perpendicular to the front surface 202 of the carrier 200. As illustrated, axis 115 is parallel to axis 215. The front surface 202 of the carrier 200 is disposed on the face 102 of the component 100. The opening of the dovetail holding groove 250 of the carrier 200 is aligned with the opening of the dovetail seal groove 150 of the component 100. A width of the opening 258 of the dovetail holding groove 250 is selected to be less than or equal to a width of the opening 158 of the dovetail seal groove 150. During operation 506 of method 500 or during operation 604 of method 600, when pressure is applied via the insertion tool 300 to the back surface 204 of the carrier 200 in a direction substantially along the axis 115 (as described above), the relative size of the openings 158, 258 and the alignment of the openings 158, 258 facilitate a damage-free transfer of the seal member 105 into the dovetail seal groove 150 of the component 100.

In the illustrated example, the first sidewall 252 of the dovetail holding groove 250 is disposed proximal to the second sidewall 154 of the dovetail seal groove 150. The first sidewall 252 of the dovetail holding groove 250 extends at the acute angle 253 to the axis 215. The second sidewall 154 of the dovetail seal groove 150 extends at the acute angle 155 to the axis 115. Additionally, the second sidewall 254 of the dovetail holding groove 250 is disposed proximal to the first sidewall 152 of the dovetail seal groove 150. The second sidewall 254 of the dovetail holding groove 250 extends at the acute angle 255 to the axis 215. The first sidewall 152 of the dovetail seal groove 150 extends at the acute angle 153 to the axis 115. It is contemplated that in the illustrated example, when pressure is applied via the insertion tool 300 to the back surface 204 of the carrier 200 in a direction substantially along the axis 115 (as described above), the second sidewall 254 of the dovetail holding groove 250 guides the seal member 105 toward a portion of the dovetail seal groove 150 bounded by the second sidewall 154 of the dovetail seal groove 150. Similarly, it is contemplated that the first sidewall 252 of the dovetail holding groove 250 guides the seal member 105 toward a portion of the dovetail seal groove 150 bounded by the first sidewall 152 of the dovetail seal groove 150.

In some embodiments, it is contemplated that angle 153 and angle 255 are substantially equal, such as within five degrees, within four degrees, within three degrees, within two degrees, or within one degree. In other embodiments, it is contemplated that angle 153 and angle 255 are not substantially equal. In some embodiments, it is contemplated that angle 155 and angle 253 are substantially equal, such as within five degrees, within four degrees, within three degrees, within two degrees, or within one degree. In other embodiments, it is contemplated that angle 255 and angle 153 are not substantially equal.

Figure 9D:
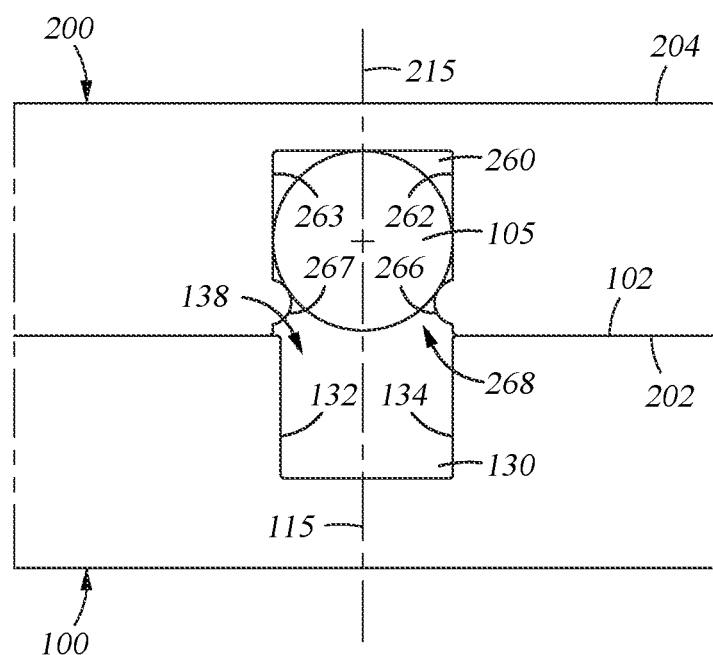

FIG. 9D illustrates the dovetail seal groove 150 of FIG. 1D and the lobed holding groove 260 of FIG. 2F. As described above, axis 115 is perpendicular to the face 102 of the component 100, and axis 215 is perpendicular to the front surface 202 of the carrier 200. As illustrated, axis 115 is parallel to axis 215. The front surface 202 of the carrier 200 is disposed on the face 102 of the component 100. The opening 268 of the lobed holding groove 260 of the carrier 200 is aligned with the opening 158 of the dovetail seal groove 150 of the component 100. A width of the opening 268 of the lobed holding groove 260 is selected to be less than or equal to a width of the opening 158 of the dovetail seal groove 150. During operation 506 of method 500 or during operation 604 of method 600, when pressure is applied via the insertion tool 300 to the back surface 204 of the carrier 200 in a direction substantially along the axis 115 (as described above), the relative size of the openings 158, 268 and the alignment of the openings 158, 268 facilitate a damage-free transfer of the seal member 105 into the dovetail seal groove 150 of the component 100.

FIGS. 9A-9D depict examples of combinations of seal groove 110 and holding groove 210 configurations. It is contemplated that any configuration described above of the holding groove 210 may be used in a carrier 200 to facilitate placement of a seal member 105 into any configuration described above of the seal groove 110.

Embodiments of the present disclosure provide apparatus and methods for rapid, accurate, uniform, and consistent installation of a seal member (and, if present, an associated spacer member) into a seal groove. The apparatus includes a carrier with a holding groove that provides protection of the seal member. The carrier is sufficiently flexible to deform under a pressure applied by an insertion tool to push at least a portion of the seal member into the seal groove.

It is contemplated that elements and features of one embodiment may be beneficially incorporated in other embodiments without further recitation. While the foregoing is directed to embodiments of the present disclosure, other and further embodiments of the disclosure may be devised without departing from the basic scope thereof, and the scope thereof is determined by the claims that follow.

What is claimed is:

1. A carrier for facilitating transfer of a seal member to a seal groove formed in a chamber component, the carrier comprising:
   a tray including a front surface and a back surface;
   a spiral-shaped holding groove formed in the front surface, the holding groove configured to contain the seal member, and including a first sidewall separated from a second sidewall, the first and second sidewalls extending from the front surface to a floor of the holding groove; and
   a first channel formed in the front surface, the first channel extending from a first location proximal to a center of the tray towards an edge of the tray and intersecting with the holding groove at a plurality of locations;
   wherein the tray is deformable in response to a pressure applied to the back surface such that the seal member is pushed out of the holding groove.

2. The carrier of claim 1, wherein the first channel is wider than the holding groove.

3. The carrier of claim 2, wherein the first channel extends to a second location proximal to the edge of the tray.

4. The carrier of claim 3, further comprising a second channel formed in the front surface and intersecting with the holding groove.

5. The carrier of claim 4, wherein the second channel extends from a third location proximal to the center of the tray to a fourth location proximal to the edge of the tray.

6. The carrier of claim 5, wherein the first channel and the second channel extend radially.

7. The carrier of claim 1, wherein the tray is at least partially see-through.

8. The carrier of claim 1, further comprising a first alignment feature formed on or in the tray.

9. The carrier of claim 8, further comprising a second alignment feature in the form of one of a hole, a recess, a cut-out, a notch, a slot, a protrusion, or other irregularity.

10. The carrier of claim 8, wherein the first alignment feature is in the form of one of a hole, a recess, a cut-out, a notch, a slot, a protrusion, or other irregularity.

11. A method of installing a seal member into a seal groove formed in a face of a chamber component, the method comprising:
    placing a front surface of a carrier against the face of the chamber component, the carrier comprising a tray including the front surface, a back surface, a spiral-shaped holding groove formed in the front surface, and a channel formed in the front surface, the channel extending from a first location proximal to a center of the tray towards an edge of the tray and intersecting with the holding groove at a plurality of locations, wherein the seal member is disposed within the holding groove, and wherein the holding groove includes a first sidewall separated from a second sidewall, the first and second sidewalls extending from the front surface to a floor of the holding groove;
    aligning the holding groove with the seal groove; and
    applying a pressure to the back surface of the tray, thereby deforming the tray and pushing the seal member out of the holding groove and into the seal groove.

12. The method of claim 11, wherein aligning the holding groove with the seal groove includes aligning an alignment feature of the carrier with a corresponding feature associated with the chamber component.

13. The method of claim 11, wherein applying a pressure to the back surface of the tray further comprises:
    applying the pressure to the back surface of the tray opposite the channel.

14. The method of claim 11, wherein applying a pressure to the back surface of the tray further comprises: applying the pressure to the back surface of the tray opposite the holding groove.

15. The method of claim 14, wherein: the holding groove includes a first opening at the front surface of the tray; the seal groove includes a second opening at the face of the chamber component; and a width of the second opening is greater than a width of the first opening.

16. The method of claim 15, wherein:
    the holding groove includes a first sidewall extending from a floor of the holding groove toward the first opening at an acute angle to the front surface; and
    when the pressure is applied to the back surface of the tray, the first sidewall guides the seal member through the first opening.

17. A method of installing a seal member into a seal groove formed in a face of a chamber component, the method comprising:
    placing a front surface of a carrier against the face of the chamber component, the carrier including:
    a tray including the front surface and a back surface;
    a spiral-shaped holding groove formed in the front surface, the seal member disposed within the holding groove, and wherein the holding groove includes a first sidewall separated from a second sidewall, the first and second sidewalls extending from the front surface to a floor of the holding groove; and
    a plurality of channels formed in the front surface, each channel of the plurality of channels extending from proximal a center of the tray towards an edge of the tray and intersecting with the holding groove at a plurality of locations;

wherein the seal member is disposed within the holding groove;

aligning the holding groove with the seal groove;

applying a pressure to the back surface of the tray opposite each of the plurality of channels, thereby deforming the tray and pushing a plurality of first portions of the seal member out of the holding groove and into the seal groove; and removing the carrier from the face of the chamber component.

18. The method of claim 17, wherein after applying a pressure to the back surface of the tray opposite each of the plurality of channels, and before removing the carrier from the face of the chamber component, the method further comprises:

applying a second pressure to the back surface of the tray opposite the holding groove, thereby deforming the tray and moving a plurality of second portions of the seal member out of the holding groove and into the seal groove.

19. The method of claim 17, wherein:

removing the carrier from the face of the chamber component causes a plurality of second portions of the seal member to exit the holding groove; and the method further comprises:

applying a second pressure to each of the plurality of second portions of the seal member, thereby moving the plurality of second portions of the seal member into the seal groove.

20. The method of claim 17, wherein aligning the holding groove with the seal groove includes aligning an alignment feature of the carrier with a corresponding feature associated with the chamber component.

* * * * *